(12) United States Patent  (10) Patent No.: US 7,917,448 B2
Smola et al.  (45) Date of Patent: Mar. 29, 2011

(54) APPARATUS AND METHOD FOR ONLINE DATING SERVICE PROVIDING THREADED MESSAGES WITH A NOTES AND DIARY FUNCTION

(75) Inventors: Egon Smola, Mountain View, CA (US); Maurice L. Clancy, Jr., San Francisco, CA (US); Wei Wang, Atherton, CA (US); Vu Hao Thi Truong, Sunnyvale, CA (US); Tracy D. Rocca, Alameda, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1359 days.

(21) Appl. No.: 11/154,122

(22) Filed: Jun. 16, 2005

(65) Prior Publication Data

US 2006/0059160 A1  Mar. 16, 2006

Related U.S. Application Data

(60) Provisional application No. 60/610,125, filed on Sep. 15, 2004.

(51) Int. Cl.
*G06Q 10/00* (2006.01)

(52) U.S. Cl. .......................... 705/319; 707/10

(58) Field of Classification Search ................. 705/1
See application file for complete search history.

(56) References Cited

U.S. PATENT DOCUMENTS

| | | |
|---|---|---|
| 5,086,394 A | 2/1992 | Shapira |
| 5,950,193 A | 9/1999 | Kulkarni |
| 5,950,200 A | 9/1999 | Sudai et al. |
| 5,963,951 A | 10/1999 | Collins |
| 5,996,006 A | 11/1999 | Speicher |
| 6,064,967 A | 5/2000 | Speicher |
| 6,175,831 B1 | 1/2001 | Weinreich et al. |
| 6,243,375 B1 | 6/2001 | Speicher |
| 6,269,369 B1 | 7/2001 | Robertson |
| 6,272,467 B1 | 8/2001 | Durand et al. |
| 6,282,515 B1 | 8/2001 | Speicher |

(Continued)

FOREIGN PATENT DOCUMENTS

CA  2 455 342 A1  6/2004

OTHER PUBLICATIONS

Notification of Transmittal of the International Search Report and the Written Opinion of the International Searching Authority, or the Declaration (11 pages).
U.S. Appl. No. 11/220,002, Official Communication mailed May 15, 2008.
Richard V. Dragan, "Tribe.net (beta)," PC Magazine, Jan. 20, 2004, <http//:www.pcmag.com/article2/0,1759,1418688,00.asp>.
Timothy J. Mullaney, "Diller's Latest Little Bet on the Net", BusinessWeek Online, Mar. 1, 2004,<http://www.businessweek.com:/print/technology/content/mar2004/tc20004031_2820_tc119.htm>.

(Continued)

*Primary Examiner* — Traci L Casler
(74) *Attorney, Agent, or Firm* — Frommer Lawrence & Haug LLP; Matthew M. Gaffney

(57) ABSTRACT

A notes function and a diary function for an online dating service is provided. Each subscriber to the online dating service has access to a message center for communicating messages between candidates. The messages in the message center are organized as threads. Additionally, a subscriber may create and edit a note associated with a candidate and/or an email message between the subscriber and the candidate. The note is by default accessible to the subscriber and inaccessible to the candidate. Furthermore, the message center can provide a facility for enabling a subscriber to create a diary regarding online dating service activities. The diary can include the authored notes, summaries, impressions, videos, movies, pictures, graphics, colors, messages, threaded messages, threaded list views, and the like.

30 Claims, 13 Drawing Sheets

U.S. PATENT DOCUMENTS

| | | |
|---|---|---|
| 6,285,984 B1 | 9/2001 | Speicher |
| 6,327,573 B1 | 12/2001 | Walker et al. |
| 6,356,879 B2 | 3/2002 | Aggarwal et al. |
| 6,385,620 B1 | 5/2002 | Kurzius et al. |
| 6,433,795 B1 | 8/2002 | MacNaughton et al. |
| 6,466,917 B1 | 10/2002 | Goyal et al. |
| 6,473,751 B1 | 10/2002 | Nikolovska et al. |
| 6,480,885 B1 | 11/2002 | Olivier |
| 6,502,077 B1 | 12/2002 | Speicher |
| 6,640,230 B1 | 10/2003 | Alexander et al. |
| 6,665,389 B1 | 12/2003 | Haste, III |
| 6,697,786 B2 | 2/2004 | Speicher |
| 6,735,568 B1 | 5/2004 | Buckwalter et al. |
| 6,742,002 B2* | 5/2004 | Arrowood ............... 707/104.1 |
| 6,745,178 B1 | 6/2004 | Emens et al. |
| 6,836,762 B2 | 12/2004 | Speicher |
| 7,069,308 B2 | 6/2006 | Abrams |
| 7,246,067 B2 | 7/2007 | Austin et al. |
| 2002/0023230 A1 | 2/2002 | Bolnick et al. |
| 2002/0040310 A1 | 4/2002 | Lieben et al. |
| 2002/0059204 A1 | 5/2002 | Harris |
| 2002/0073079 A1 | 6/2002 | Terheggen |
| 2002/0091768 A1* | 7/2002 | Balasubramanian ......... 709/204 |
| 2002/0116458 A1 | 8/2002 | Bricklin et al. |
| 2002/0116466 A1 | 8/2002 | Trevithick et al. |
| 2002/0124053 A1 | 9/2002 | Adams et al. |
| 2002/0178163 A1 | 11/2002 | Mayer |
| 2002/0188636 A1 | 12/2002 | Peck et al. |
| 2003/0050977 A1 | 3/2003 | Puthenkulam et al. |
| 2003/0071852 A1* | 4/2003 | Stimac ......................... 345/810 |
| 2003/0093405 A1 | 5/2003 | Mayer |
| 2003/0117436 A1* | 6/2003 | Kautto-Koivula et al. ... 345/762 |
| 2003/0167324 A1 | 9/2003 | Farnham et al. |
| 2003/0191673 A1 | 10/2003 | Cohen |
| 2003/0200217 A1 | 10/2003 | Ackerman |
| 2004/0010484 A1 | 1/2004 | Foulger et al. |
| 2004/0031058 A1 | 2/2004 | Reisman |
| 2004/0080534 A1* | 4/2004 | Quach ......................... 345/751 |
| 2004/0088315 A1 | 5/2004 | Elder et al. |
| 2004/0088322 A1 | 5/2004 | Elder et al. |
| 2004/0088325 A1 | 5/2004 | Elder et al. |
| 2004/0122681 A1 | 6/2004 | Ruvolo et al. |
| 2004/0122803 A1 | 6/2004 | Dom et al. |
| 2004/0122810 A1 | 6/2004 | Mayer |
| 2004/0122855 A1 | 6/2004 | Ruvolo et al. |
| 2004/0167794 A1 | 8/2004 | Shostack et al. |
| 2004/0210661 A1 | 10/2004 | Thompson |
| 2004/0215793 A1 | 10/2004 | Ryan et al. |
| 2004/0260781 A1 | 12/2004 | Shostack et al. |
| 2005/0004837 A1 | 1/2005 | Sweeney et al. |
| 2005/0055231 A1 | 3/2005 | Lee |
| 2005/0076003 A1 | 4/2005 | DuBose et al. |
| 2005/0197846 A1 | 9/2005 | Pezaris et al. |
| 2006/0031121 A1 | 2/2006 | Speicher |
| 2006/0106780 A1 | 5/2006 | Dagan |
| 2006/0287928 A1 | 12/2006 | Terrill et al. |
| 2007/0073687 A1 | 3/2007 | Terrill et al. |
| 2007/0073802 A1 | 3/2007 | Terrill et al. |
| 2008/0059576 A1 | 3/2008 | Liu et al. |
| 2009/0164464 A1 | 6/2009 | Carrico et al. |

OTHER PUBLICATIONS

"FAQs About the ZeroDegrees Service," visited on Sep. 8, 2004, <http://www.zerodegrees.com/faq.htm>.

Jason Ethier, "Current Research in Social Network Theory," <http://upaya.soc.neu.edu/archive/students/Ethier-SocialNetworks.html>.

MetricStream, Enterprise Quality and Compliance Management Solutions, "Zaplet Technology within MetricStream" visited on Sep. 16, 2005, <www.metricstream.com/products/zap_tec_ms.htm>.

Gmail, "About Gmail," visited on Sep. 16, 2005, <http://mail.google.com/mail/help/about.html>.

True U, "Using True," visited on Sep. 16, 2005, <www.true.com/magazine/true_coach_summertips_part9.htm>.

AmericanSingles.com, "Learn More About AmericanSingles.com," visited on Sep. 16, 2005, <www.americansingles.com/default.asp?p=13010&CategoryID=62>.

U.S. Appl. No. 11/218,904, Official Communication mailed Apr. 18, 2006.

U.S. Appl. No. 11/218,904, Official Communication mailed Sep. 19, 2006.

U.S. Appl. No. 11/218,904, Official Communication mailed Jan. 16, 2007.

U.S. Appl. No. 11/218,904, Official Communication mailed Jun. 29, 2007.

U.S. Appl. No. 11/012,543, Official Communication mailed Feb. 26, 2007.

U.S. Appl. No. 11/012,543, Official Communication mailed Aug. 8, 2007.

International Search Report dated Oct. 24, 2006, for International Application PCT/US05/31142, filed Aug. 31, 2005.

Non-Final Office Action mailed Feb. 26, 2007, for U.S. Appl. No. 11/012,543, filed Dec. 14, 2004.

Final Office Action mailed Aug. 8, 2007 for U.S. Appl. No. 11/012,543, filed Dec. 14, 2004.

Non-Final Office Action mailed on Apr. 18, 2006 for U.S. Appl. No. 11/218,904, filed Sep. 2, 2005.

Final Office Action mailed Sep. 19, 2006 for U.S. Appl. No. 11/218,904, filed on Sep. 2, 2005.

Non-Final Office Action mailed Jan. 16, 2007 for U.S. Appl. No. 11/218,904, filed Sep. 2, 2005.

Final Office Action mailed Jun. 29, 2007 for U.S. Appl. No. 11/218,904, filed Sep. 2, 2005.

European Supplementary Search Report for Application No. EP 05 79 6512, mailed May 4, 2009.

Rees, Michael J., "User Interfaces for Lightweight In-line Editing of Web Pages," IEEE, 1999, pp. 88-94.

International Search Report Dated Aug. 5, 2008, for International Application PCT/US05/31143, filed Aug. 31, 2005.

Non-Final Office Action mailed Aug. 18, 2008 for U.S. Appl. No. 11/191,389, filed Jul. 28, 2005.

Shneiderman, Ben, "Dynamic Queries For Visual Information Seeking," IEEE Software, Nov. 1994, pp. 70-77.

Document Classification, Wikipedia, http://en.wikipedia.org/wiki/text_categorization, Dec. 27, 2004, (Accessed Jan. 11, 2010).

Automatic Summarization, Wikipedia, http://en.wikipedia.org/wiki/automatic_summarization, May 5, 2004, (Accessed Jan. 11, 2010).

Languageware, Wikipedia, http://en.wikipedia.org/wiki/languageware, Oct. 18, 2007, (Accessed Jan. 11, 2010).

Linear Regression, Wikipedia, http://en.wikipedia.org/wiki/linear_regression, Mar. 18, 2001, (Accessed Jan. 11, 2010).

Doyle, M.E. and Smith, M.K., "Friendship: Theory and Experience," The Encyclopaedia of Informal Education, 2002 (best available date), http://www.infed.org/biblio/friendship.htm, (Accessed Jan. 11, 2010).

Hartup, W. W., "Having Friends, Making Friends, and Keeping Friends: Relationships as Educational Contexts," ERIC Digest, http://ceep.crc.uiuc.edu/pubs/ivpaguide/appendix/hartup-friends.pdf, 1992 (best available date).

Marmaros, D. and Sacerdote, B., "How Do Friendships Form?," American Economic Associate, Dec. 23, 2004, http://www.aeaweb.org/annual_mtg_papers/2005/0107_1430_1103.pdf, (Accessed Jan. 10, 2010).

Helm, B., "Friendship," Stanford Encyclopedia of Philosophy, May 17, 2005, http://plato.stanford.edu/entries/friendship, (Accessed Jan. 11, 2010).

US Patent & Trademark Office, Office Communication mailed Dec. 18, 2009 in U.S. Appl. No. 11/012,543, 12 pgs.

U.S. Appl. No. 11/220,002, Official Communication mailed on Jul. 15, 2009.

U.S. Appl. No. 11/012,543, Official Communication mailed on Aug. 6, 2009.

* cited by examiner

APPARATUS AND METHOD FOR ONLINE DATING SERVICE PROVIDING THREADED MESSAGES WITH A NOTES AND DIARY FUNCTION

CROSS-REFERENCE TO RELATED APPLICATIONS

This application claims the benefit of U.S. Provisional Application Ser. No. 60/610,125 filed on Sep. 15, 2004, the benefit of the earlier filing date of which is hereby claimed under 35 U.S.C. §119 (e) and further incorporated by reference.

FIELD OF THE INVENTION

The present invention relates generally to online dating services, and in particular, to an apparatus and method for allowing an online dating service subscriber to write personal notes and each candidate and/or on each message between the subscriber and the candidate.

BACKGROUND OF THE INVENTION

Dating services are now so popular that by at least one study for the given year, over twenty-six percent of all Internet users in America have visited a personals website. Part of the reason may be that online dating may appear to be a natural extension of where people are at this point in time. That is, many people today, have personal computers, or at least access to a personal computer. Moreover, virtually everyone wants to fall in love. Thus, it is natural to merge these two things. As such, online dating services may appear as the world's biggest singles bar. Except that it can be done in the privacy of one's own home where time may be taken to read about another person and get to know them through email, phone, and the like, before ever going on an actual date.

Thus, there has been a flurry of companies launching services that help people to meet and develop a personal relationship. Many of these companies, however, are struggling with developing additional services that will build customer loyalty. Without the ability to extend the value of the online dating experience, online dating may lose its appeal. Therefore, it is with respect to these considerations and others that the present invention has been made.

BRIEF DESCRIPTION OF THE DRAWINGS

Non-limiting and non-exhaustive embodiments of the present invention are described with reference to the following drawings, in which.

DETAILED DESCRIPTION OF THE INVENTION

Figure 1:
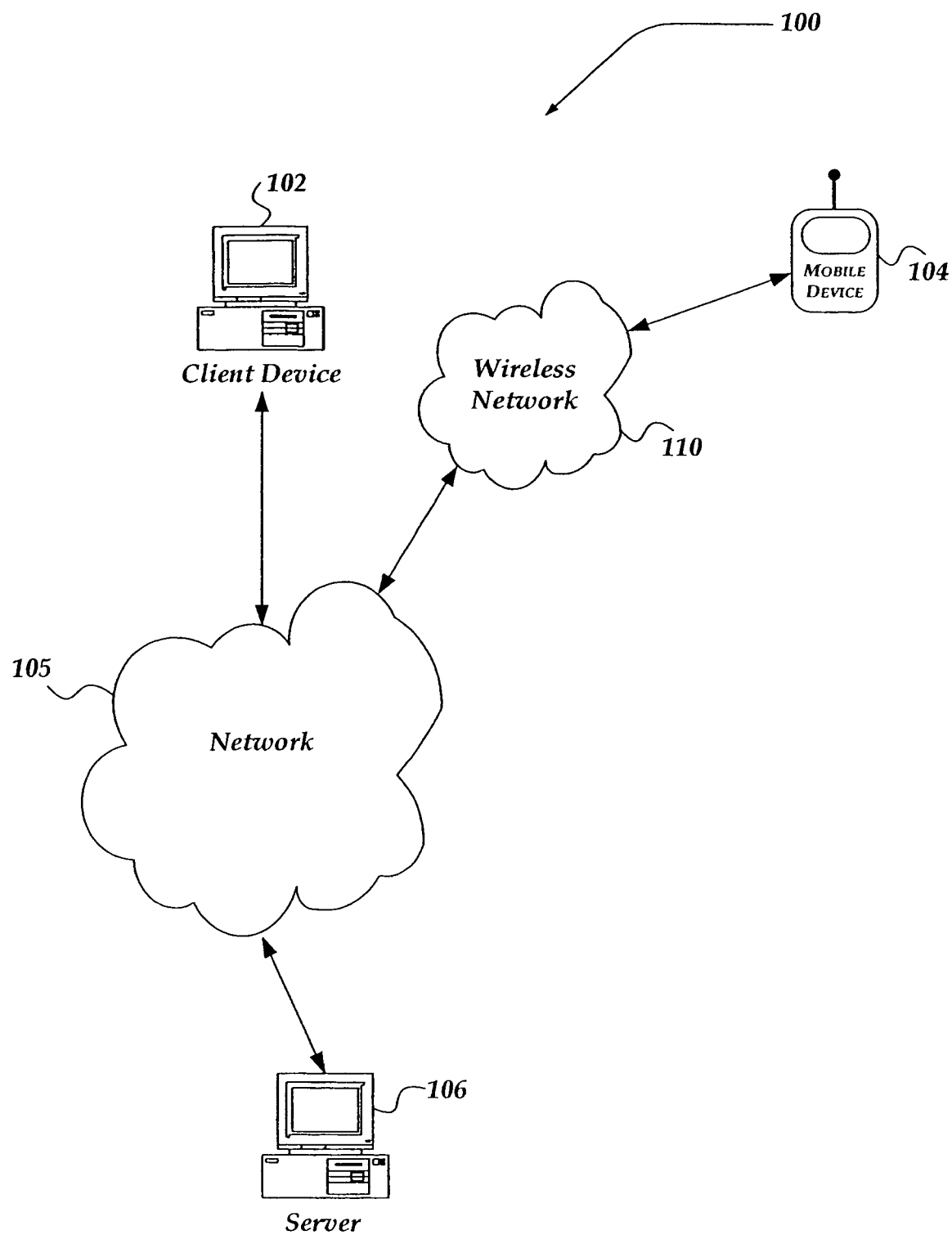
FIG. 1 shows a block diagram of an embodiment of a system for providing an online dating service with a notes function.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may.

Briefly stated, the invention is related to an apparatus, system, and method for providing a notes function for a messaging service that is associated with an online dating service. A typical subscriber to the online dating service is provided access to an individual interface to a message center for communicating and viewing messages between other subscribers. The messages in the message center can be organized as threads. Additionally, the personal message center can provide a facility that enables a subscriber to create and edit a note associated with another subscriber and/or a message(s) between the subscriber and the other subscriber. Typically, access to the note is limited to the subscriber and not made available to the other subscriber(s). Furthermore, the personal message center can provide a facility for enabling a subscriber to create a diary regarding online dating service activities. The diary can include the authored notes, summaries, impressions, videos, movies, pictures, graphics, colors, messages, threaded messages, threaded list views, and the like.

As used herein, the word "subscriber" is not necessarily limited to a user who has subscribed to the online dating service; in one embodiment, it may refer to a user that has created a profile but has not subscribed to the online dating service.

Illustrative Operating Environment

FIG. 1 illustrates one embodiment of an environment in which an embodiment the present invention may operate. However, not all of these components may be required to practice the invention, and variations in the arrangement and type of the components may be made without departing from the spirit or scope of the invention. As shown, system 100 of FIG. 1 includes network 105, wireless network 110, server 106, client device 102, and mobile device 104.

Generally, client device 102 may include virtually any computing device capable of receiving and sending a message over a network, such as network 105, wireless network 110, and the like, to and from another computing device, such as server 106, mobile device 104, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client device 102 also may be any computing device that is capable of connecting using a wired or wireless communication medium such as a PDA, POCKET PC, laptop computer, wearable computer, and any other device that is equipped to communicate over a wired and/or wireless communication medium.

Client device 102 may include a browser application that is configured to receive and to send web pages, web-based messages, and the like. The browser application may be configured to receive and display graphics, text, multimedia, and the like, employing virtually any web based language, including Standard Generalized Markup Language (SGML), such as HyperText Markup Language (HTML), and so forth.

Client device 102 may further include a client application that enables it to perform a variety of other actions, including, communicating a message, such as through a Short Message Service (SMS), Multimedia Message Service (MMS), instant messaging (IM), internet relay chat (IRC), mIRC, Jabber, blog, and the like, between itself and another computing device. The browser application, and/or another application, such as the client application, a plug-in application, and the like, may enable client device 102 to communicate content to another computing device.

Mobile device 104 represents one embodiment of a client device that is configured to be portable. Thus, mobile device 104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile device 104 typically ranges widely in terms of capabilities and features. For example, a cell phone may have a numeric keypad and a few lines of monochrome LCD display on which only text may be displayed. In another example, a web-enabled remote device may have a touch sensitive screen, a stylus, and several lines of color LCD display in which both text and graphics may be displayed. Moreover, the web-enabled remote device may include a browser application enabled to receive and to send wireless application protocol messages (WAP), and the like. In one embodiment, the browser application is enabled to employ a Handheld Device Markup Language (HDML), Wireless Markup Language (WML), WMLScript, JavaScript, and the like, to display and send a message.

Mobile device 104 also may include at least one client application that is configured to receive content from another computing device. The client application may include a capability to provide and receive textual content, graphical content, audio content, and the like. The client application may further provide information that identifies itself, including a type, capability, name, identifier, and the like. The information may also indicate a content format that mobile device 104 is enabled to employ. Such information may be provided in a message, or the like, sent to server 106, and the like.

Mobile device 104 may be configured to communicate a message, such as through a Short Message Service (SMS), Multimedia Message Service (MMS), instant messaging (IM), internet relay chat (IRC), mIRC, Jabber, and the like, between another computing device, such as server 106, and the like. However, the present invention is not limited to these message protocols, and virtually any other message protocol may be employed.

Client device 102 and/or mobile device 104 may be further configured to enable a user to participate in an online dating service, manage personal user information associated with the online dating service, and the like, which may in turn be saved at a location, such as server 106, and the like. As such, client device 102 and/or mobile device 104 may further include a client application that is configured to manage various actions on behalf of the client device. For example, the client application may enable a user to interact with the browser application, email application, and the like, to manage their online dating information. For example, the user may employ the client application, in part, to create a user profile, access and interact with a personals mailbox, and the like.

The client application also may interact with various other components of the system as described in more detail below. For example, in at least one embodiment, the client application is configured to enable the user to provide a fee for at least a portion of the online dating service.

Wireless network 110 is configured to couple mobile device 104 and its components with network 105. Wireless network 110 may include any of a variety of wireless sub-networks that may further overlay stand-alone ad-hoc networks, and the like, to provide an infrastructure-oriented connection for mobile device 104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile device 104 with various degrees of mobility. For example, wireless network 110 may enable a radio connection through a radio network access such as Global System for Mobile communication (GSM), Code Division Multiple Access (CDMA), General Packet Radio Services (GPRS), Enhanced Data GSM Environment (EDGE), Wideband Code Division Multiple Access (WCDMA), CDMA 2000, Universal Mobile Telecommunication System (UMTS), and the like. In essence, wireless network 110 may include virtually any wireless communication mechanism by which information may travel between mobile device 104 and another computing device, network, and the like.

Network 105 is configured to couple server 106 and its components with other computing devices, including, client device 102, server 106, and through wireless network 110 to mobile device 104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between server 106 and another computing device.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

In one embodiment, server 106 provides support for an online dating service server and a messaging service server. In one embodiment, the online dating service server and the messaging service server are integrated together, and in another embodiment, they are separate applications that are provided with interfaces to communicate with each other. One embodiment of server 106 is described in more detail below in conjunction with FIG. 2. Briefly, however, server 106 may include any computing device capable of connecting to network 105 to enable a user of at least one of client device 102 or mobile device 104 to manage their online dating activities and related information. Devices that may operate as server 106 include personal computers desktop computers, multiprocessor systems, microprocessor-based or programmable consumer electronics, mobile devices, network PCs, servers, and the like.

It is noted that while FIG. 1 illustrates a single computing device operable as server 106, the invention is not so limited. For example, the actions attributable to server 106 may be distributed across multiple computing devices, such as a group of servers, a network cluster, and the like, without departing from the scope or spirit of the invention. Additionally, although not shown, a peer to peer arrangement of wired and/or wireless devices can also be arranged to perform substantially the same actions attributable to the client-server architecture disclosed for FIG. 1.

Illustrative Server Environment

Figure 2:
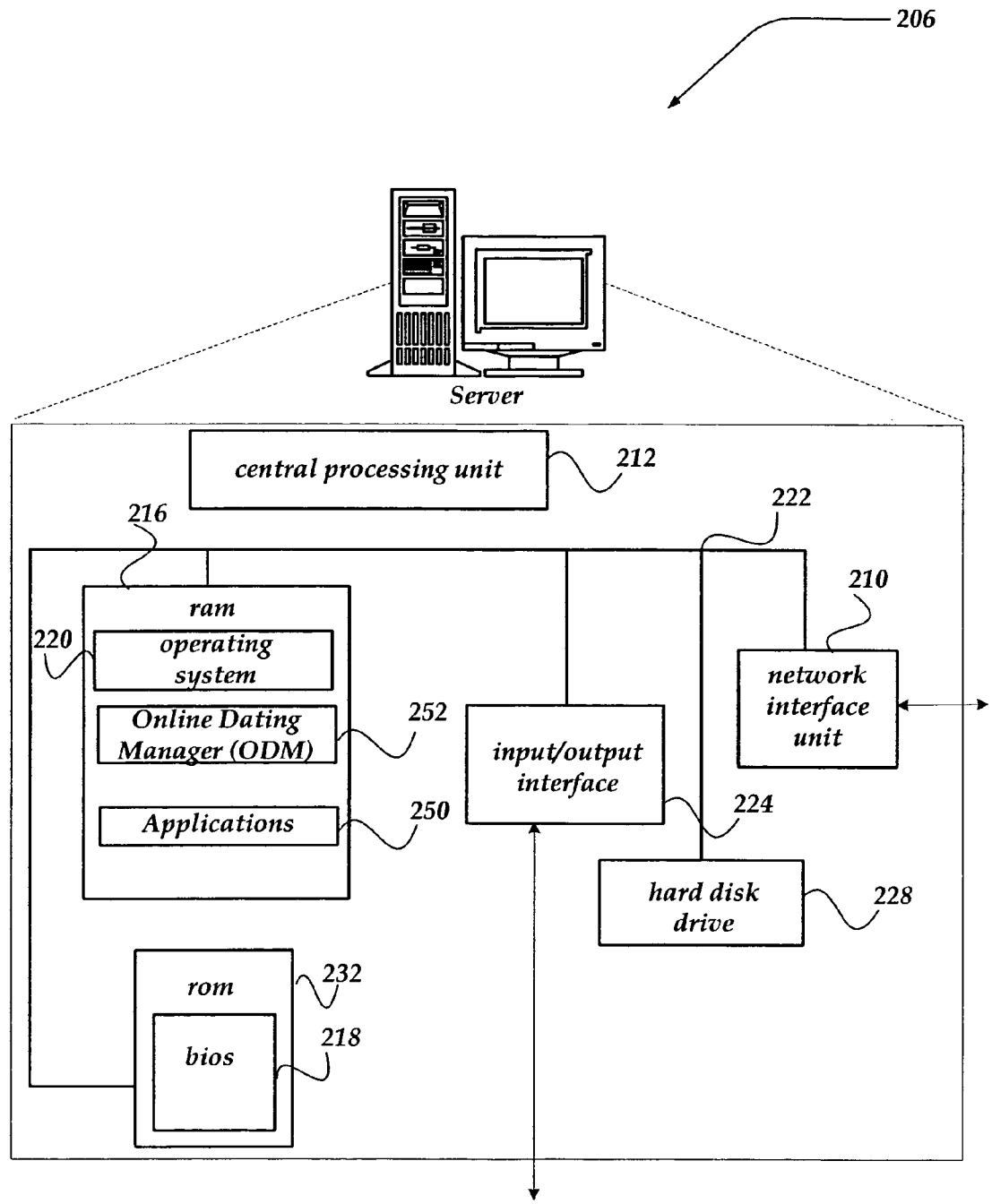
FIG. 2 illustrates a block diagram of an embodiment of the server device of FIG. 1.

FIG. 2 shows one embodiment of server device 206. An embodiment of server device 206 may be employed as an embodiment of server 106 of FIG. 1. Server device 206 may include many more components than those shown. The components shown, however, are sufficient to disclose an illustrative embodiment for practicing the invention.

Server device 206 includes processing unit 212, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of server 206. Any general-purpose operating system may be employed. Basic input/output system ("BIOS") 218 is also provided for controlling the low-level operation of server 206. As illustrated in FIG. 2, server device 206 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, network interface card (NIC), and the like.

Server device 206 may also include an SMTP handler application for transmitting and receiving email. Server device 206 may also include an HTTP handler application for receiving and handing HTTP requests, and an HTTPS handler application for handling secure connections. The HTTPS handler application may initiate communication with an external application in a secure fashion.

Server device 206 also includes input/output interface 224 for communicating with external devices, such as a mouse, keyboard, scanner, or other input devices not shown in FIG. 2. Likewise, server device 206 may further include additional mass storage facilities such as hard disk drive 228. Hard disk drive 228 is utilized by server device 206 to store, among other things, application programs, databases, and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include schedulers, calendars, web services, transcoders, database programs, word processing programs, spreadsheet programs, and so forth. Applications 250 can also include a messaging service for Instant Messaging (IM), Short Messaging Service (SMS), email, and the like. The messaging service can enable facilities for providing notes to messages and/or a diary of activities associated with the online dating service. Mass storage may further include applications such as online dating manager (ODM) 252.

ODM 252 is configured to enable a user to manage their online dating user information, communicate with other users, and non-users, and to generally pursue an online dating relationship. Further, ODM 252 is configured to provide a variety of features to enable a user of a client device to participate in the online dating experience.

In one embodiment, ODM 252 is configured to store a message between a subscriber and another subscriber that is provided by a messaging service, and to associate the message with a profile of the other subscriber. Also, ODM 252 is configured to enable the subscriber to provide a note that is associated with the profile and/or the message. ODM 252 is configured to save the note and make the note accessible to the subscriber, and inaccessible to other subscribers. Additionally, ODM 252 is configured to enable the user to display the note along with the profile and/or the message. In another embodiment, the functionality of the messaging service may be integrated with ODM 252 to enable substantially the same actions as a separate messaging service application.

In one embodiment, ODM 252 is configured to provide a personal mailbox for each subscriber. Further, messages in the personal mailbox can be organized as threads. ODM 252 may be configured to allow a subscriber to access a thread view list that displays a thread list indicating a profile for each other subscriber with which the subscriber has communicated. Also, ODM 252 may be configured to enable the subscriber to access the thread for each profile, where the thread includes each email sent to or from the subscriber associated with the profile. In one embodiment, ODM 252 is configured to enable the subscriber to create and edit a note for any profile in the thread list view. In one embodiment, ODM 252 is configured to enable the subscriber to create and edit a note for any message in a thread.

Moreover, in one embodiment, ODM 252 may employ a process, such as process 400 described below in conjunction with FIG. 4 to perform actions, such as those described above.

In one embodiment, by creating personal notes on profiles and/or messages, the notes serve a diary function that allows subscribers to record impressions of other subscribers and the progress of the relationship at various points in time. In one embodiment, ODM 252 is also configured to provide a separate diary function facility that enables a subscriber to store the personal note as well as the profile and/or message associated with the personal note. ODM 252 may be configured to enable the subscriber to edit the diary and its contents. In one embodiment, the diary may include text, pictures, emoticons, audio files, graphics, movies, video, graphics, color, notes, messages, threaded messages, thread list views, profiles, and/or animations, and the like.

Furthermore, ODM 252's associated actions and/or subcomponents may be decomposed and distributed across multiple computing devices similar to server device 206 of FIG. 2. In addition, a user (subscriber) interface sub-component of ODM 252 may be distributed across still another server, array of servers, and the like.

Illustrative Client Device

Figure 3:
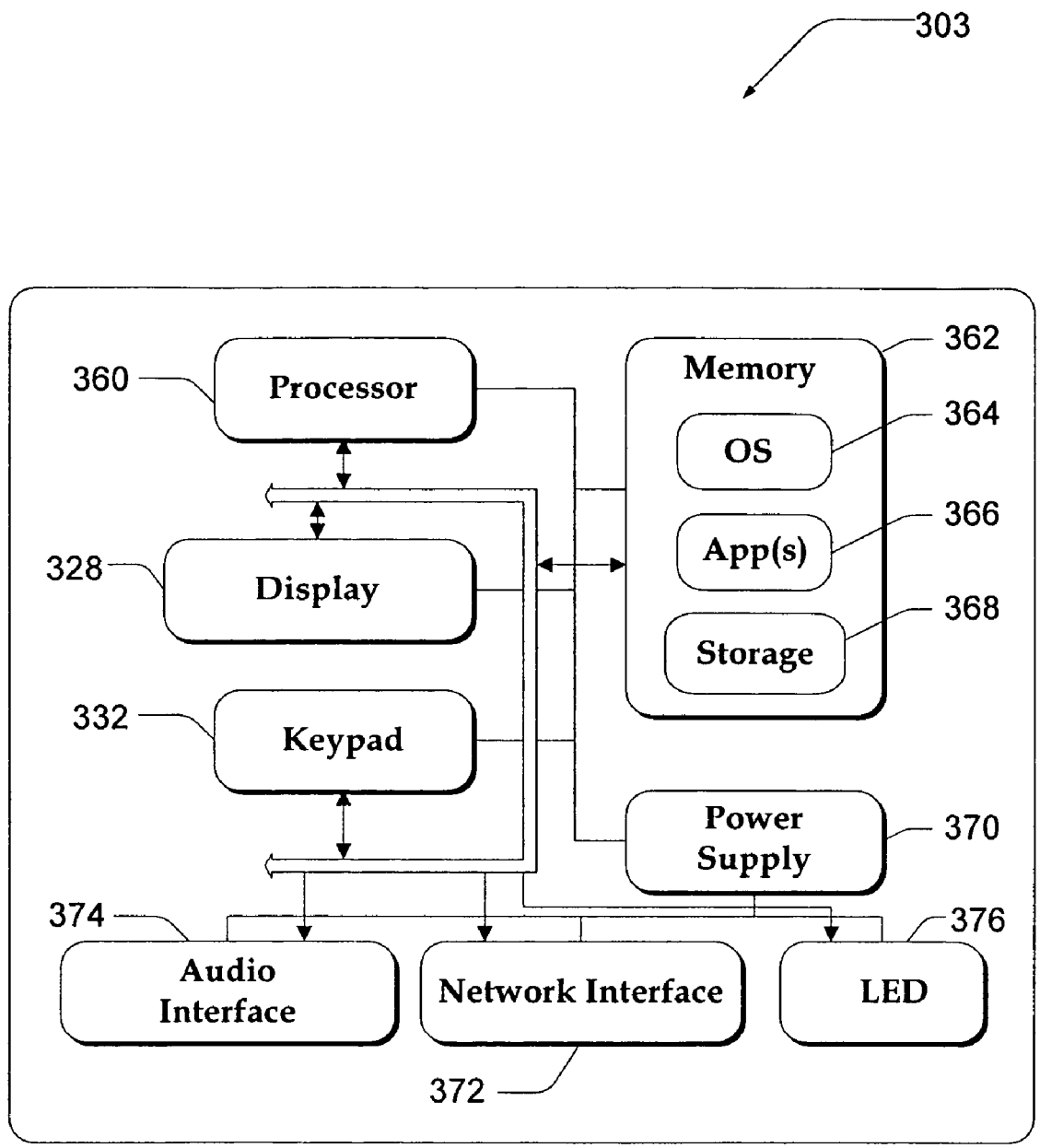
FIG. 3 shows a block diagram of an embodiment of the client device and/or mobile device of FIG. 1.

FIG. 3 is a functional block diagram illustrating an embodiment of communication device 303. Communication device 303 may be employed as an embodiment of client device 102 and/or mobile device 104 of FIG. 1. In one embodiment of the present invention, communication device 303 is implemented as a mobile communication device, such as a personal digital assistant (PDA), smart cellular telephone, cellular telephone, pager, and the like. Communication device 303 may also include handheld computers, tablet computers, personal computers, multiprocessor systems, game consoles, media players, microprocessor-based or programmable consumer electronics, network PCs, wearable computers, and the like.

Communication device 303 may include many more components than those shown in FIG. 3. The components shown, however, are sufficient to disclose an illustrative embodiment for practicing the invention.

As shown in FIG. 3, communication device 303 includes processor 360, memory 362, display 328, and keypad 332. Memory 362 generally includes both volatile memory (e.g., RAM) and non-volatile memory (e.g., ROM, Flash Memory, or the like). Communication device 303 includes operating system 364, which may be resident in memory 362 and configured to execute on processor 360. Keypad 332 may be a push button numeric dialing pad (such as on a typical telephone), a multi-key keyboard (such as a conventional keyboard), and the like. Display 328 may be a liquid crystal display, or any other type of display useable in mobile communication devices. For example, display 328 may be touch-sensitive, and may then also act as an input device enabling entry of stencil input, touch display, and so forth.

One or more application programs 366 may be loaded into memory 362 and run on operating system 364. Examples of application programs include email programs, scheduling programs, Wireless Application Protocol (WAP) browsers, word processing programs, spreadsheet programs, and the like. However, the invention is not limited to these examples, and others may be employed. Communication device 303 also includes non-volatile storage 368 within memory 362. Non-volatile storage 368 may be used to store persistent information which is not intended to be lost if the communication device 303 is turned off. Application programs 366 may use and store information in storage 368, such as e-mail or other types of messages used by a messaging application, databases, and the like, documents used by a word processing application, and the like. A synchronization application may also reside on communications device 303 and be programmed to interact with a corresponding synchronization application resident on another computer to keep the information stored in storage 368 synchronized with corresponding information stored at the other computer.

One or more applications programs 366 may be configured to enable a subscriber to communicate messages in an online dating service. In one embodiment, the user may employ an application program to access a stored message communicated between the subscriber and another subscriber. Also, the subscriber may employ the application program to communicate with an online dating server to create and edit a personal note associated with the message and/or the profile of the other subscriber. The online dating server may associate the note with the message and/or the other profile. Furthermore, the online dating server may also provide an interface to save the note, and provide access to the note to the subscriber, while making the note inaccessible to the other subscriber(s). Also, the subscriber may employ the application program to communicate with the online data server to access a note that is associated with the message and/or the profile, and to display the note along with the message and/or the profile.

Communication device 303 may also include power supply 370, which may be implemented as one or more batteries, solar devices, and the like. Power supply 370 might further include an external power source, such as an AC adapter and/or a powered docking cradle that supplements or recharges the batteries.

In one embodiment, communication device 303 includes different types of external notification mechanisms, e.g. LED 340 and audio interface 374. These devices may be directly coupled to power supply 370 so that when activated, they remain on for a duration dictated by the notification mechanism even though processor 360 and other components might shut down to conserve battery power. LED 340 may be programmed to remain on indefinitely until the user takes action to indicate the powered-on status of the device. Audio interface 374 may be used to provide audible signals to and receive audible signals from the user. For example, audio interface 374 may be coupled to a speaker for providing audible output and to a microphone for receiving audible input, such as to facilitate a telephone conversation.

Communication device 303 also includes network interface 372, which is configured to perform the function of transmitting and receiving at least one type of external communication with another device. Network interface 372 facilitates, for example, wireless connectivity between communication device 303, another communication device and/or a server via a wireless communication mechanism which may or may not be facilitated by a wireless service provider. Transmissions to and from network interface 372 may be conducted under control of operating system 364. In other words, communications received by network interface 372 may be disseminated to application programs 366 via operating system 364, and vice versa. Network interface 372 also allows communication device 303 to communicate with other computing devices, such as over a wired network, using a variety of wired communications mechanisms that may or may not be facilitated by a wired service provider. Network interface 372 is sometimes known as a transceiver or transceiving device.

Network interface 372 is one example of a component that enables communication over a communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media can also include wired media such as a wired network or direct-wired connection, and wireless media such as acoustic, RF, infrared and other wireless media. The term computer readable media as used herein includes both storage media and communication media.

Illustrative Embodiment of a Message Center

In one embodiment, the online dating service has a plurality of subscribers, each having a profile. The profile may include information such as gender, income, age, education, hobbies, politics, marital status, birthdate, profession, photo thumbnail, geographical location, body type, height, eye color, hair color, ethnicity, sense of humor, employment status, religion, interests, and/or the like.

The online dating service includes access to a personal message center for each subscriber. In one embodiment, the message center is an extension of a message system that is integrated with the online dating service. In another embodiment, the message center is a separate application that provides message functionality to a subscriber of the online dating service. In each embodiment, the user interface of the message center is arranged to provide an intuitive platform for sending and receiving messages between other subscribers. In one embodiment, the message center is configured to send and receive emails only. In other embodiments, the message center is configured to send and receive various other forms of communication as well, such as IM, SMS, Multimedia Message Service (MMS), voice, video, animations, emoticons, colors, movies, sounds, blogs, Internet Relay Chat (IRC), blogs, and the like.

In one embodiment, instead of an inbox for handling individual sent and received messages, the message center can be organized according to threads with other subscribers. A thread begins when a subscriber communicates with another subscriber within that subscriber's thread list view, or receives a message from another subscriber. Threads are two-way relationships between a subscriber and a unique profile. The thread list view may include a sortable, visually simple view of all the profiles with whom the subscriber has communicated. In one embodiment, the thread list view shows new and recently updated threads at the top by default. Also, the thread list view may show the specific status of each thread in the message center.

Also, in one embodiment, the message center may provide additional functionality that allows subscribers and non-subscribers to optimize their communication with other members. For example, in one embodiment, the message center provides a "Need More Info" request tool that generates a system message requesting that the recipient provide the sender with additional detail. In this embodiment, such responses may request that the recipient post a photo, add additional detail to his/her profile, complete a personality or relationship test, and/or write a more detailed "In my own words . . . " description. Also, in one embodiment, a similar system messaging feature allows members to end communication with other members tactfully through a list of "no thanks" responses. These gender-specific responses notify the recipient about a lack of mutual interest or chemistry and keep users engaged in the service by suggesting affinity profiles for the recipient to consider. In one embodiment, the recipient is able to save and contact affinity profiles directly from the "No Thanks" response.

Additionally, the message center can provide a facility that enables a subscriber to author a note(s) associated with an individual message, a selected group of messages, threaded messages, a thread list view, and the like. Generally, a note is just accessible to the authoring subscriber and unavailable to other subscribers. However, in one embodiment, the authoring subscriber can be provided with a control for enabling selective access to a note(s) by another subscriber(s).

Furthermore, the message center can provide another facility for enabling a subscriber to author a diary associated with online dating service activities. In one embodiment, the diary could include the notes authored by the subscriber and associated with messages communicated between subscribers. In another embodiment, the diary could include summaries, impressions, pictures, graphics, videos, movies, colors, animations, messages, threaded messages, thread view lists, and/or notes. Moreover, the diary facility enables a subscriber to author information associated with at least one online dating service activities, such as meetings, events, "dates" with other subscribers, and the like. Also, the diary could be arranged to present authored information on a daily, weekly, monthly, quarterly, or some other periodic or randomly arranged basis.

The thread status indicators for messages may include:

Message Type: Indicates the type of the most recent update to the thread as either a message (including email, IM, SMS, MMS, Voice, animations, voice, video, animations, emoticons, colors, sounds, blogs, Internet Relay Chat (IRC), blog, and the like), or a predetermined message such as an icebreaker, hello, goodbye, insult, flirt, and/or promotion.

Direction: Indicates the direction of the most recent update to the thread as either sent or received.

Sender Status Indicators (which indicate the status of users sending messages to the owner of the Message Center) may include:

Unavailable: A new or existing thread that has enabled the "unavailable" auto-reply in Options/Preferences.

Available: The opposite of unavailable above.

Also, for each profile in the thread list view, some or all of the following may be displayed.

Personals Name (may be an alias that is different than the subscriber's actual name)

Nickname

Primary photo thumbnail

Basic profile data (e.g. age, geographic location)

"Preview" of most recent message sent (e.g., "Hey, I liked your icebreaker . . . ")

Date w/time stamp of last message received or sent (e.g., Thu 2/26 11:00 AM)

Reply button

Checkbox for additional actions (e.g., Delete, Flag as Important, Autosend pre-canned message) to allow users to execute multiple tasks from the Thread List easily.

Thread Status and Sender Status for each thread as described above.

In one embodiment, from the thread list view, the user can perform various actions, such as deleting one or more profiles from the thread list. Also, the user can click on a profile that is shown in the thread list view to see a thread view that includes all messages sent to and received from that profile since the first contact between the two users.

In one embodiment, the thread view for messages associated with a profile is updated with each new message. The thread view may display the full history of the two-way subscriber conversation, a collapsible inline summary of the other subscriber's profile (e.g. "about me", "about my match", "in my own words", share profile with a friend, and conversation starters), photo thumbnail, nickname, reply, edit draft (if applicable), delete, save profile, flag as important, block, return to Thread List, return to Search Results (if applicable), help, view trash, view block list, report abuse, and options related to "pre-canned messages" (e.g., No Thanks, Need More Info) and conversation tools (e.g., conversation templates, notes, saved snippets). Visual icons and cues may be used to show 1) the Thread Status as described above and/or 2) if a draft requires completion. In one embodiment, all types of messages in a given thread are shown in reverse chronological order (i.e., most recent thread updates at top of view). In one embodiment, a subscriber is able to print and/or make the Thread View relatively easily available for reference/review offline.

In one embodiment, the message view displays a profile photo thumbnail and profile summary of recipient; a compose/reply text box; buttons to send, save as draft, cancel, "attach profile" (so that non-searchable subscribers can share their profile(s)), international profile selection (so that subscribers with multiple international profiles can select which profile to attach to the thread); and tools for 1) creating "pre-predetermined messages" and 2) saving "snippets". In one embodiment, a word verification process is incorporated as part of the message sending process. In one embodiment, the reply version of this page displays the full thread history so that users may refer to it when drafting messages. In one embodiment, messages may be composed with rich text enhancements that enable a subscriber to include various rich text enhancements such as emoticons, colors, bolding, italics, underline, fonts, and the like, to personalize their communication with other subscribers.

In one embodiment, subscribers are able to sort their thread list and trash folder quickly according to the following criteria:

Nickname: Sortable by alphabetical order, or reverse.

Photo thumbnail: Sortable first by those with photo, and then by those without, or reverse.

Date w/time stamp of last message received or sent (e.g., Thu 2/26 11:00 AM): Sortable by chronological or reverse chronological order.

Message Type: Sortable by messages first, then by predetermined messages, or reverse.

Direction: Sortable by most recently received first, then by most recently sent, or reverse.

Read/Unread: Sortable by unread messages first, then by read messages, or reverse.

Sender Status for each thread, that is, 1) available; 2) unavailable (or the reverse of this order).

Sort by new: Sorting new subscribers (e.g., those who subscribed two weeks ago or less) first.

"Notes" indicator: Sortable first by those threads for which the subscriber has saved notes and then by those without notes, or reverse.

"Importance Flag": Sortable first by those threads flagged as "most important" by the subscriber, followed by all other threads.

In one embodiment, instead of a traditional drafts folder, subscribers can save unfinished messages from within the Message View for each thread. In the Thread View, the text of these drafts are shown as part of the thread itself but are visible only to the subscriber that has saved the draft (i.e., the other subscriber(s) listed in the thread does not see the draft). In one embodiment, both the Thread View and the Message View are clearly indicated when the message is a Draft, and the fact that the other subscriber cannot see the draft text until the message is sent. The following additional rules can also apply as applicable:

If a subscriber has saved but not sent a draft, the draft is visually differentiated in the Thread View and/or the Thread List View Once a subscriber completes and sends a draft from the Message View, the final draft text is shown as sent.

If a draft has been saved and the subscriber receives a new message from the other subscriber in the thread before the draft is sent, the new message is still shown in the thread to maintain the reverse chronological order of the thread. After the draft is sent, the sent message is moved into the thread.

In addition to enabling the functionality of a message center, the online dating service server may also provide other various functions to subscribers. For example, in one embodiment, the subscriber can view profiles of other subscribers, and can save a viewed profile in a saved profiles list that may be viewed on a saved profile page. In one embodiment, integrated elements from the message center are included in the saved profiles page, such as notes, diary, and a view thread link, if applicable. The subscriber can click on the thread view link to display the thread view for the profile in the message center.

Although one embodiment of a message center has been discussed, the invention is not so limited, and other embodiments are within the scope and spirit of the invention.

Illustrative Process

Figure 4A:
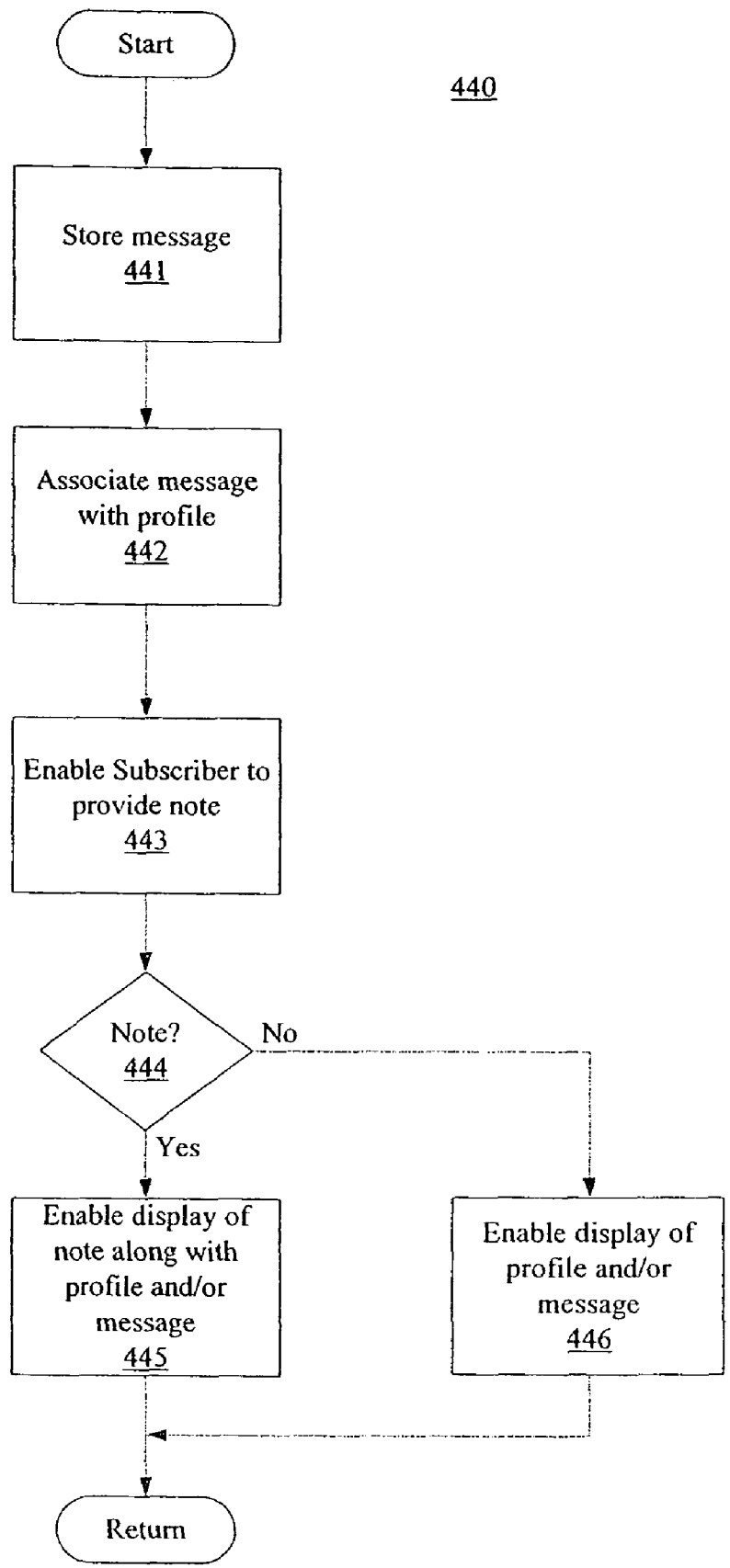
FIG. 4A illustrates a flowchart of an embodiment of a process for providing a notes function for an online dating service.

FIG. 4A illustrates a flowchart of an embodiment of a process 440, which may be employed for providing a notes function for an online dating service.

After a start block, the process proceeds to block 441, where a message sent from one subscriber to another is saved.

In one embodiment, the message is an email message. In other embodiments, the message may be any one of an email message, an SMS message, and MMS message, an IM message, and/or the like. The process then moves to block 442, where the message is associated with a profile.

The process then advances to block 443, where the process enables the subscriber to create and edit a note. In one embodiment, the subscriber may create the note to be associated with one of the profiles in the thread list view, but cannot create a note for a specific message. In another embodiment, the subscriber may create the note to be associated with one of the messages in the thread view, but cannot create a note associated with the profile generally. In yet another embodiment, the subscriber may create a note for either a profile or a message. In one embodiment, the note is a text file. In other embodiments, the note may include a picture, text, emoticon, audio file, graphic, movie, color, blog, and/or animation. The note is saved on the online dating server and associated with the profile and/or the message. The note is accessible by the subscriber that created the note, but is not accessible by the other subscriber.

The process then proceeds to decision block 444, where a determination is made as to whether there is a note associated with a profile and/or message to be displayed. If not, the process proceeds to block 446. However, if the determination at decision block 444 is positive, the process proceeds to block 445, where the process enables display of the note along with the profile and/or message. Different embodiments of the processing at block 445 are described in more detail with regard to FIGS. 5A-5C below. Briefly however, in one embodiment of the "displaying of the note along with the profile and/or message", the note and profile are both displayed on the screen. In another embodiment of "displaying the note along with the profile and/or message", the profile and/or message and a link to the note are both displayed on the screen.

At block 446, the process enables the display the profile and/or message without a note link. The process then proceeds to the return block, where other processing is resumed.

Figure 4B:
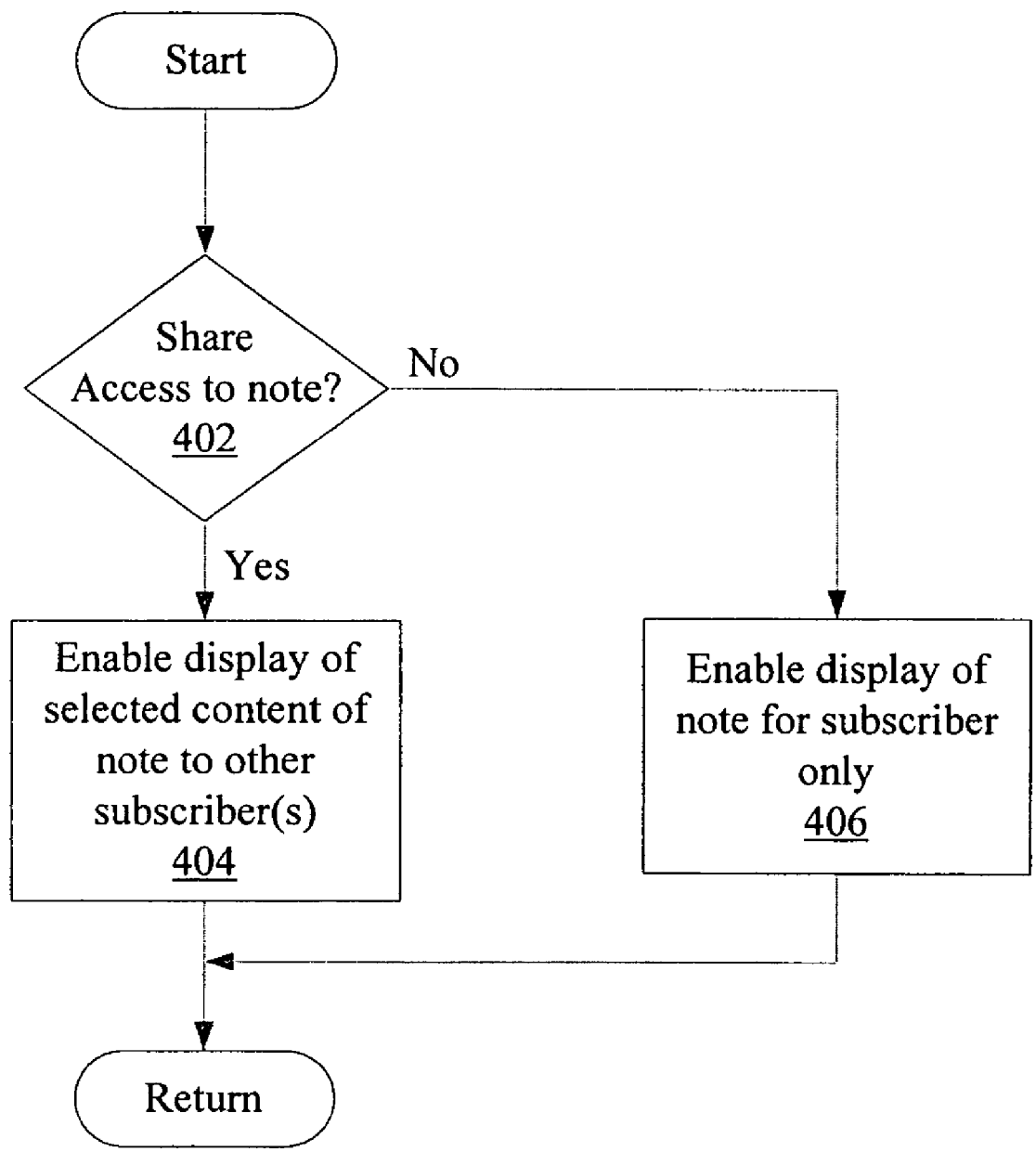
FIG. 4B illustrates a flowchart of an embodiment of a process for enabling a subscriber to control access by others to notes.

In one embodiment, notes are accessible to the subscriber who wrote the note, and inaccessible to other subscribers. In another embodiment, notes are accessible to only the subscriber by default, the subscriber may elect to allow a note to be accessed by another subscriber. FIG. 4B illustrates a flowchart of an embodiment of process 449, which may be employed for enabling a subscriber to control access by others to notes.

After a start block, the process proceeds to decision block 402, where a determination is made as to whether the access to the note should be shared. For example, the use may indicate that the note should be shared by selecting an option to share the note from a menu. If it is determined that access to the note should be shared, the process advances to block 404, where display of the note to one or more other subscriber(s) is enabled. The process then proceeds to a return block, whether other processing is resumed.

However, if it is determined that access to the note should not be shared, the process moves to block 406, where display of the note is enabled only for the subscriber who wrote the note. The process then proceeds to a return block, whether other processing is resumed.

Figure 5A:
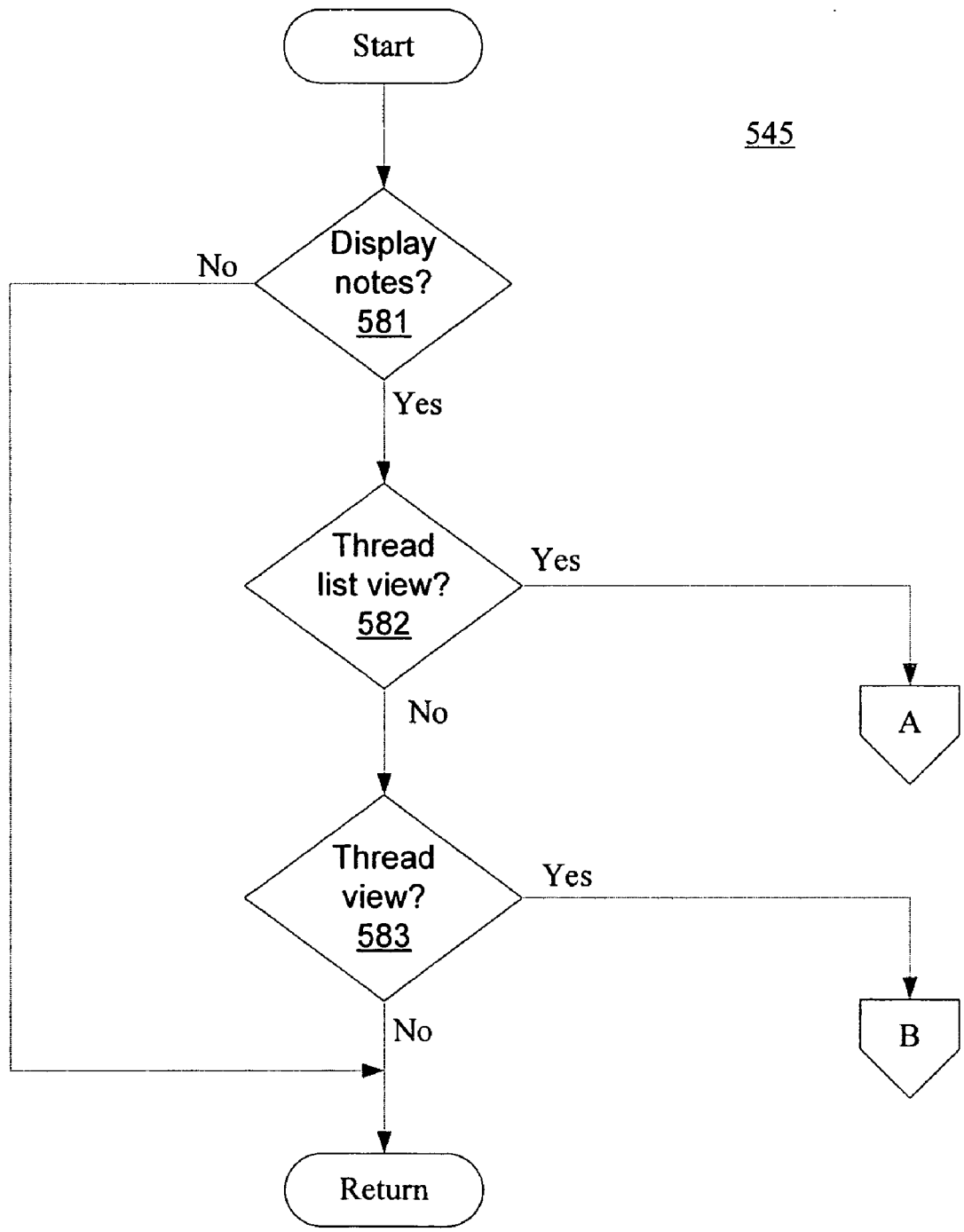
FIG. 5A-5C show a more detailed flowchart of embodiments of a portion of the process of FIG. 4.
Figure 5B:
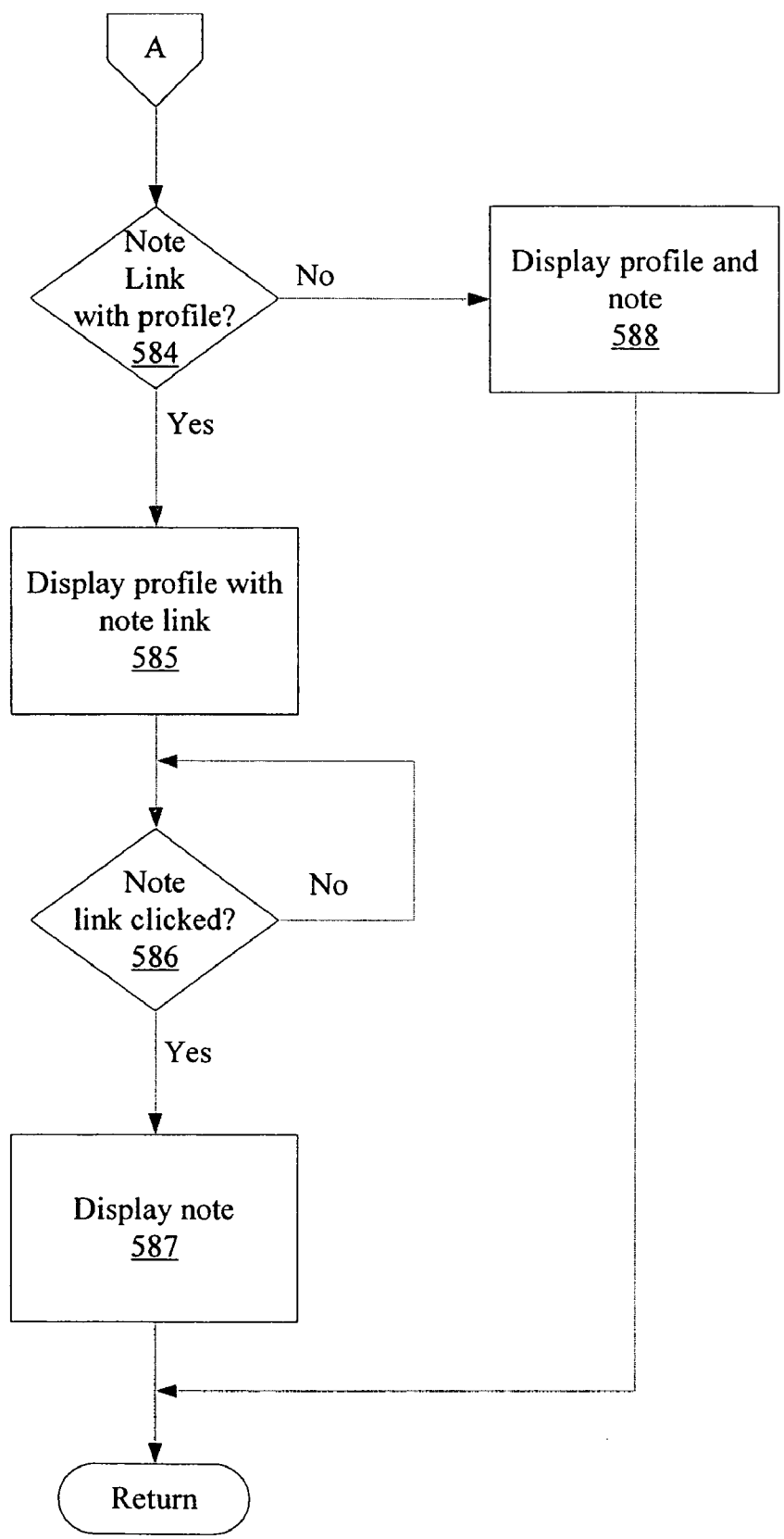
Figure 5C:
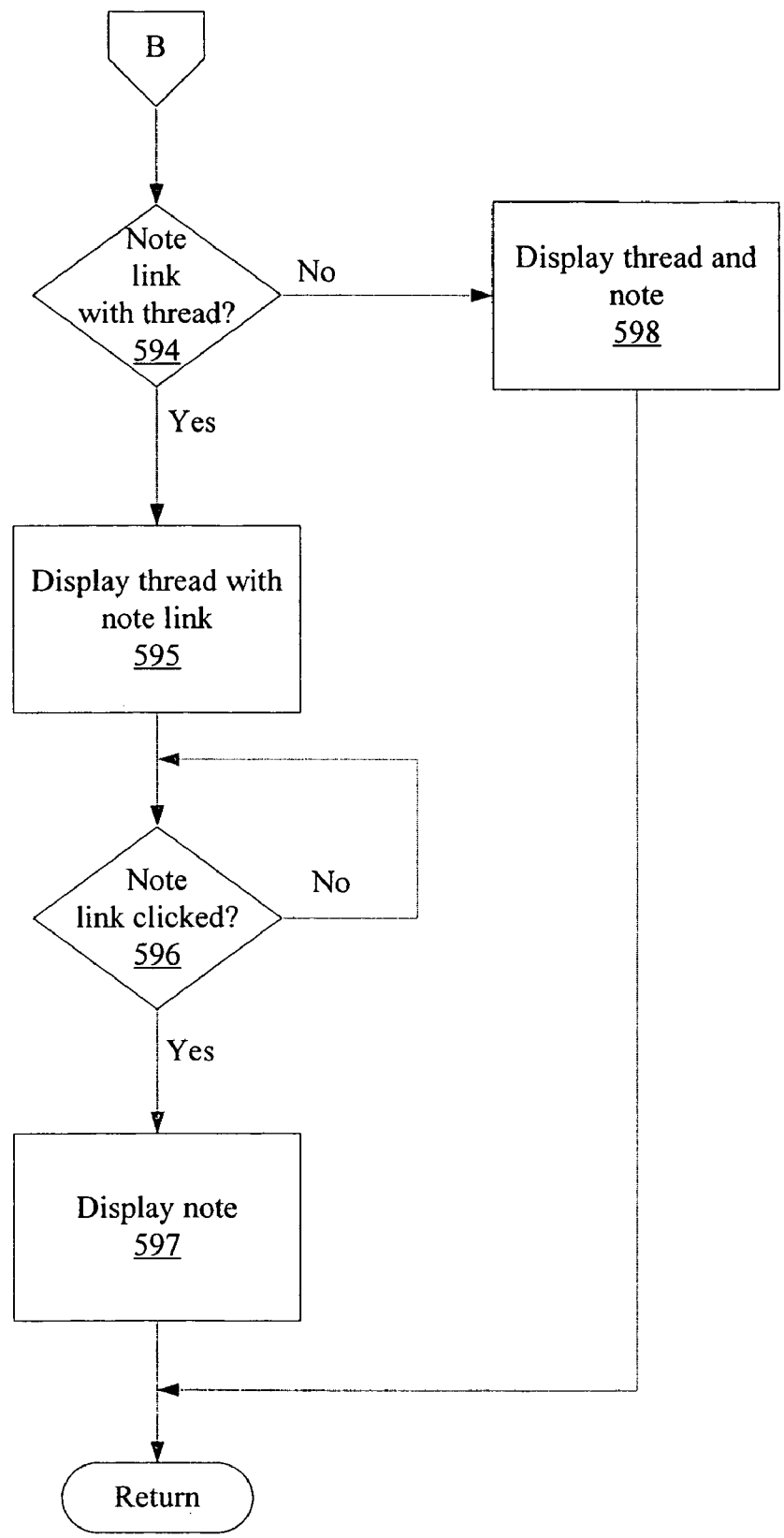

FIG. 5A-5C illustrate a flowchart of embodiments of process 545. Process 545 includes additional embodiments for the processing of actions discussed for block 445 in FIG. 4.

After a start block, the process proceeds to decision block 581, where a determination is made as to whether the display of notes has been enabled. In some embodiments, there may not be an option to disable the display of notes, in which case the determination is automatically positive. If the determination at decision block 581 is negative, the process advances to the return block, where other processing is resumed.

However, if the determination at decision block 581 is positive, the process moves to decision block 582, where a determination is made as to whether the subscriber is accessing the thread list view. If so, the process proceeds to decision block 584. Otherwise, the process advances to decision block 583, where a determination is made as to whether the subscriber is accessing the thread view. If so, the process proceeds to decision block 594. Otherwise, the process moves to the return block, where other processing is resumed.

At decision block 584, for an embodiment in which note links are not employed for profiles, the process proceeds to block 588. However, for an embodiment in which note links are employed for profiles, the process advances to block 585, where the profile is displayed with a note link. In one embodiment, the note link is displayed as an icon. The process then proceeds to decision block 586, where a determination is made as to whether the note link is clicked. If not, the process continues to monitor whether the note link is clicked. However, if the note link is clicked, the process proceeds to block 587, where the note is displayed. The process then advances to the return block, where other processing is performed.

At block 588, the profile and the note are both displayed. The process then moves to the return block, where other processing is resumed.

At decision block 594, for an embodiment in which note links are not employed for messages, the process proceeds to block 598. However, for an embodiment in which note links are employed for messages, the process advances to block 595, where the message is displayed with a note link. The process then proceeds to decision block 596, where a determination is made as to whether the note link is clicked. If not, the process continues to monitor whether the note link is clicked. However, if the note link is clicked, the process proceeds to block 597, where the note is displayed. The process then advances to the return block, where other processing is performed.

At block 598, the message and the note are both displayed. The process then moves to the return block, where other processing is resumed.

Figure 6:
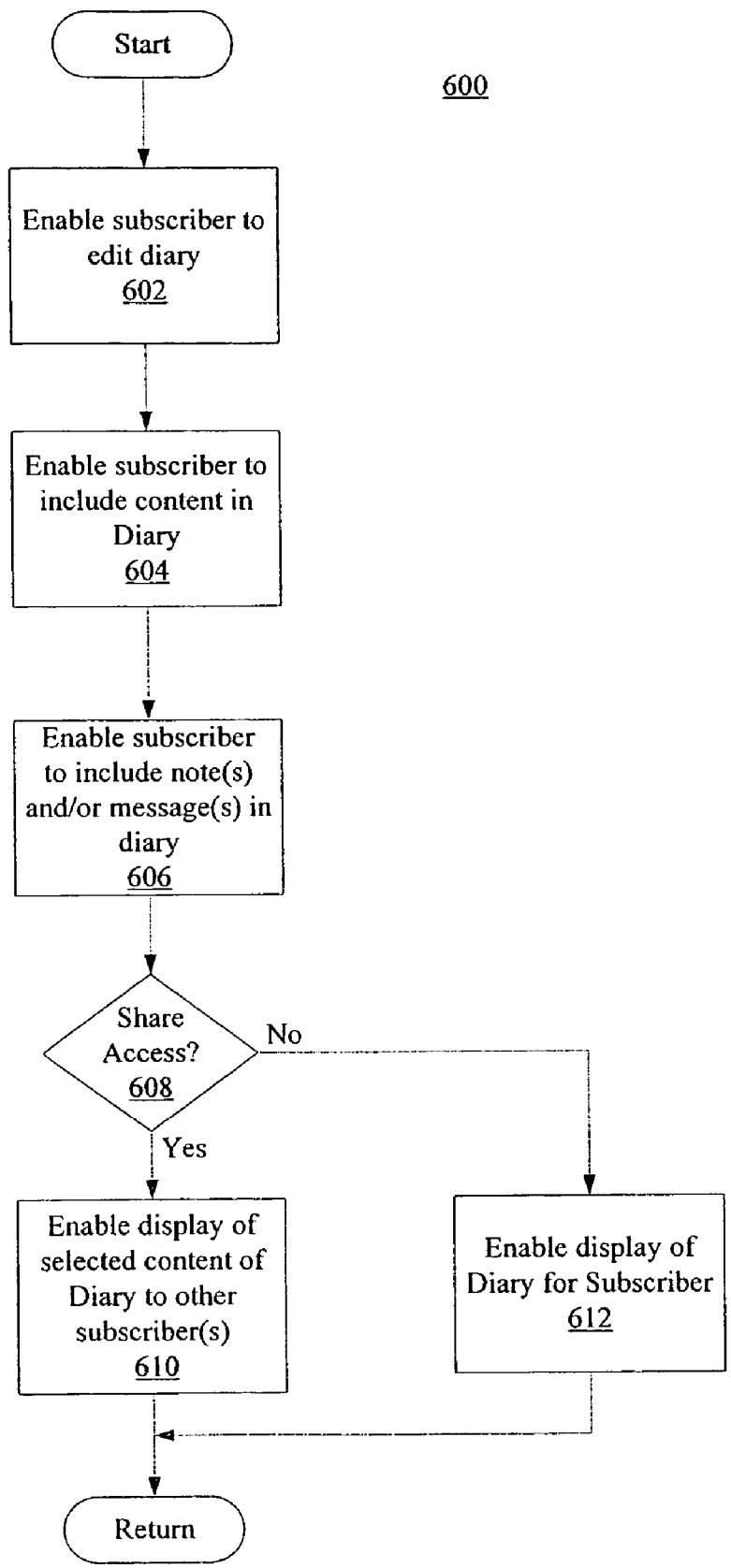
FIG. 6 illustrates a flowchart of a process for providing a diary function for an online dating service.

FIG. 6 illustrates a flowchart of an embodiment of process 600, which may be employed for providing a diary function for an online dating service. After a start block, the process proceeds to block 602, where the process enables the subscriber to edit a diary. Next, the process moves to block 604, where the process enables the subscriber to include content in the diary. In one embodiment, the content that the subscriber is enabled to add may include pictures, text, emoticons, audio files, graphics, movies, colors, animation, and/or the like. The process then advances to block 606, where the process enables the subscriber to include note(s) and/or message(s) in the diary. In one embodiment, the diary may automatically include notes that the subscriber has created for profiles or messages, and the subscriber may add additional commentary to the diary as desired.

The process then proceeds to decision block 608, where a determination is made as to whether access to the diary should be shared. Similar to access to notes as discussed in process 449 of FIG. 4, in one embodiment, the subscriber may choose whether to share access to the diary. If it is determined that access to the note should be shared, the process advances to block 610, where display of the note to one or more other subscriber(s) is enabled. The process then proceeds to a return block, whether other processing is resumed.

However, if it is determined that access to the note should not be shared, the process moves to block 612, where display of the note is enabled only for the subscriber who wrote the note. The process then proceeds to a return block, whether other processing is resumed.

Figure 7A:
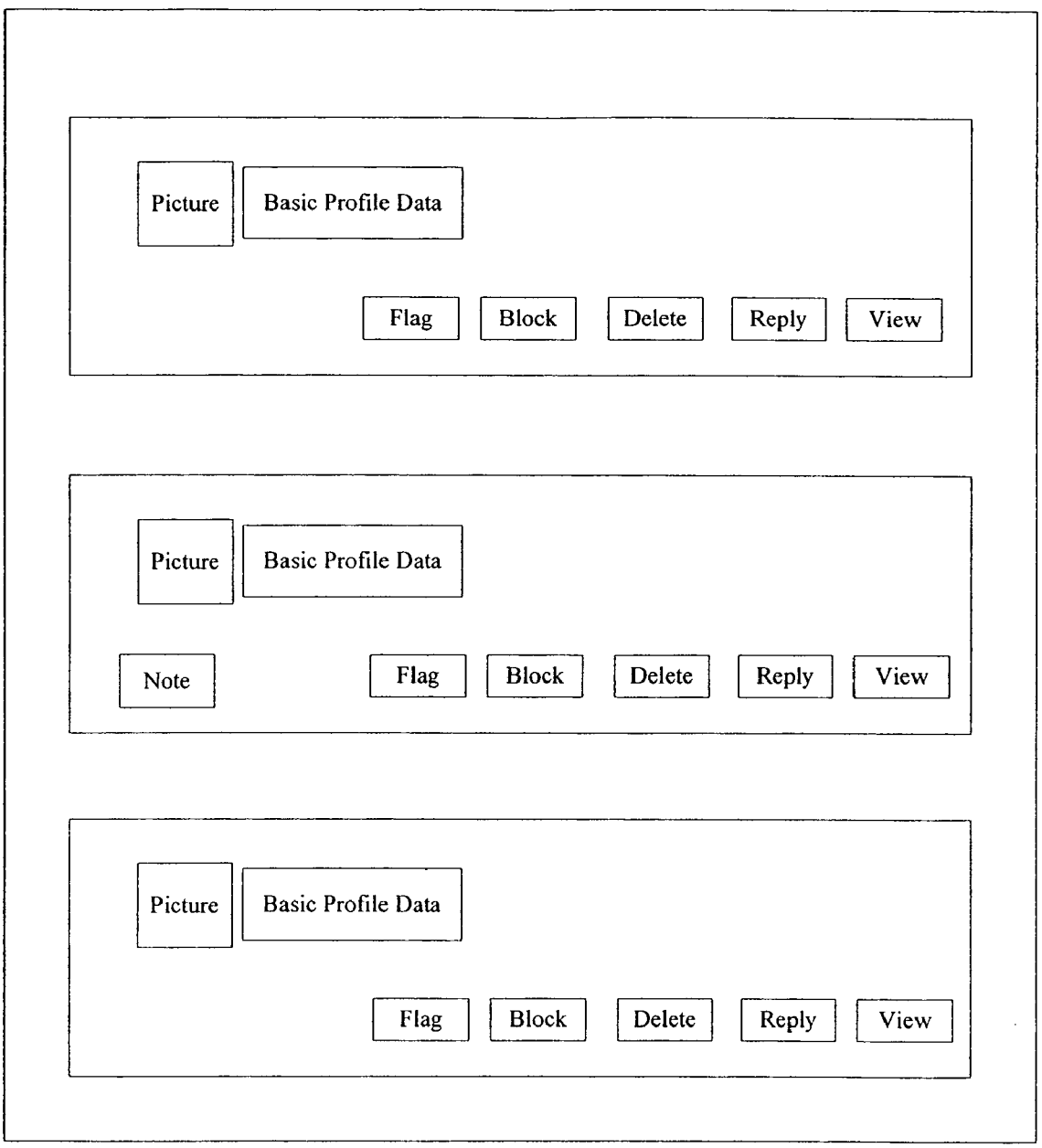
FIG. 7A shows an embodiment of a thread list view.

FIG. 7A shows an embodiment of thread list view 700. As shown in one embodiment, each profile in the thread list view may include a picture (e.g. a photo thumbnail); basic profile data (such as a headline or alias, age, and geographic location); a note icon if the subscriber has created a note for the profile; and control buttons to allow various action such as flag, block, delete, replay, and view. Also, in some embodiments, although not shown in FIG. 7A, each profile in the thread list view may include additional information such as a preview of the most recent message such, the day and time of the most recent message sent, a checkbox, thread status, a sender status, and/or the like.

Figure 7B:
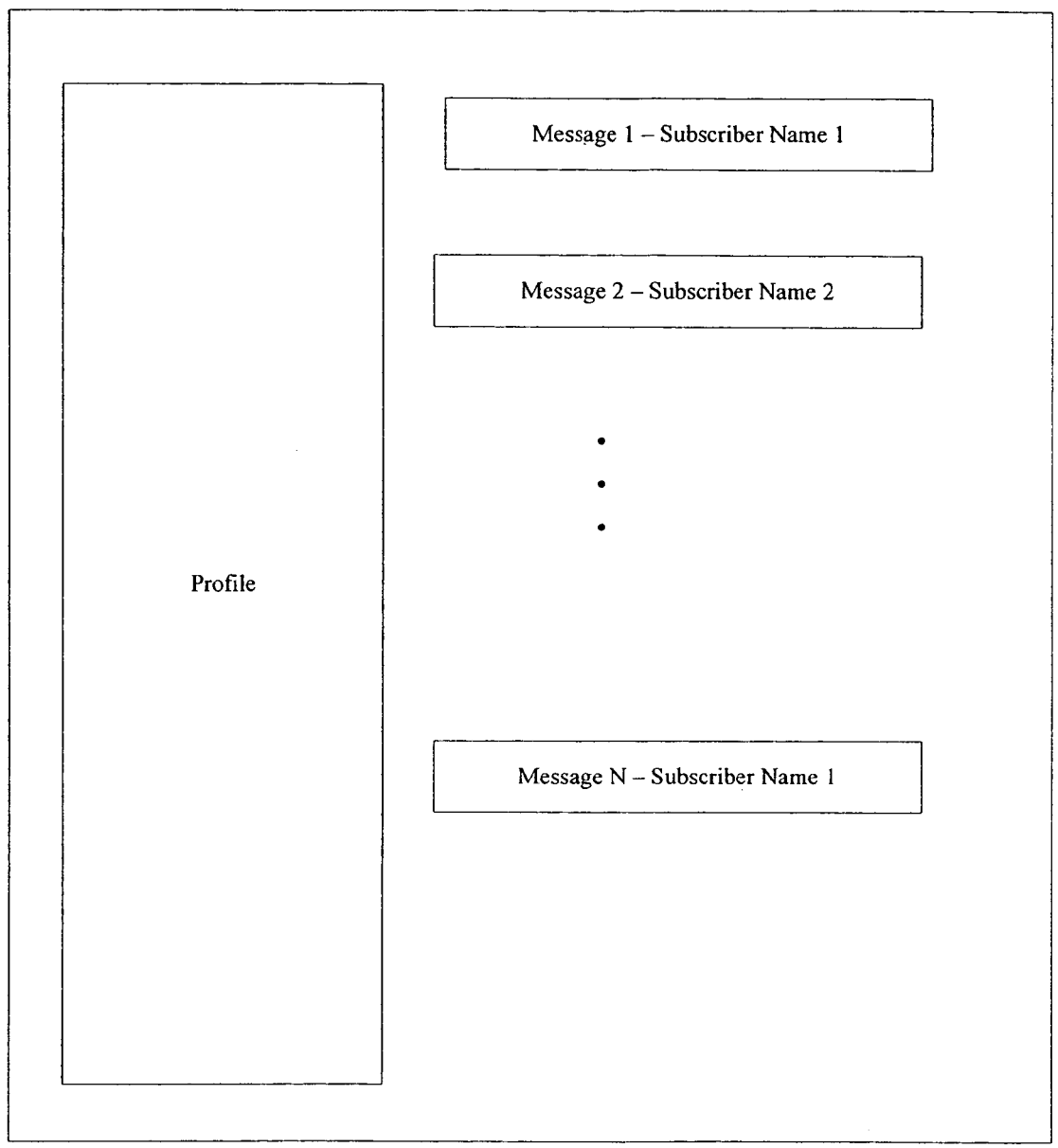
FIG. 7B illustrates an embodiment of a thread view.

In one embodiment, if the subscriber clicks the "View" button for a particular profile, the thread view for the profile is displayed. FIG. 7B illustrates an embodiment of thread view 701. In one embodiment, the thread view includes a full profile, including information such as gender, income, age, education, hobbies, politics, marital status, birthdate, profession, photo thumbnail, geographical location, body type, height, eye color, hair color, ethnicity, sense of humor, employment status, religion, interests, and/or the like.

In one embodiment, the thread view displays the full history of the two-way subscriber communication. In one embodiment, subscribers may create a note associated with any message in the thread, and messages having an associated note may be so indicated with a note icon. In one embodiment, all communication between the two subscribers is treated as one thread. When the subscriber elects to see the thread list for a particular profile, some or all of the communication between the two subscribers is listed. In one embodiment, they are listed chronologically by default, with the subscriber having various options to sort the order of the messages in the thread.

Figure 7C:
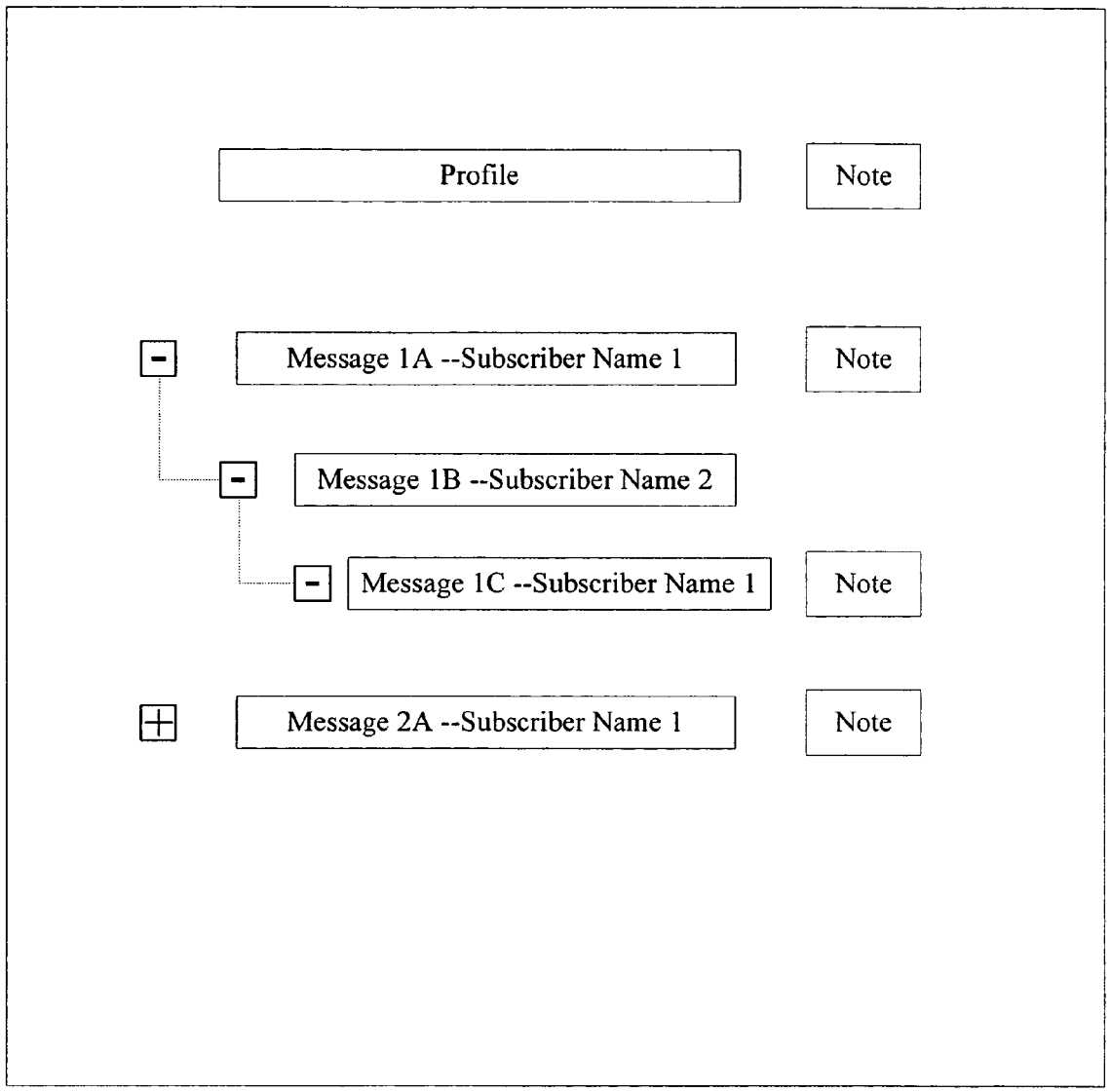
FIG. 7C illustrates another embodiment of a thread view.

In another embodiment, communication between the two subscribers may be organized as one or more separate threads based on topic, as illustrated in FIG. 7C. FIG. 7C illustrates an embodiment of thread list view 702. In thread list view 702, messages between the two subscribers are organized as one or more separate collapsible threads and sub-threads based on topic. In one embodiment, in a similar manner as thread list view 701 of FIG. 7B, in one embodiment, subscribers may create a note associated with any message in the thread, and messages having an associated note may indicated with a note icon. In this embodiment, the subscriber may access the note by clicking on the note icon. In another embodiment, rather than displaying a note icon, for each message with a note, all or part of the note is displayed. In yet another embodiment, notes may be associated with a profile and not with an individual message.

Figure 8:
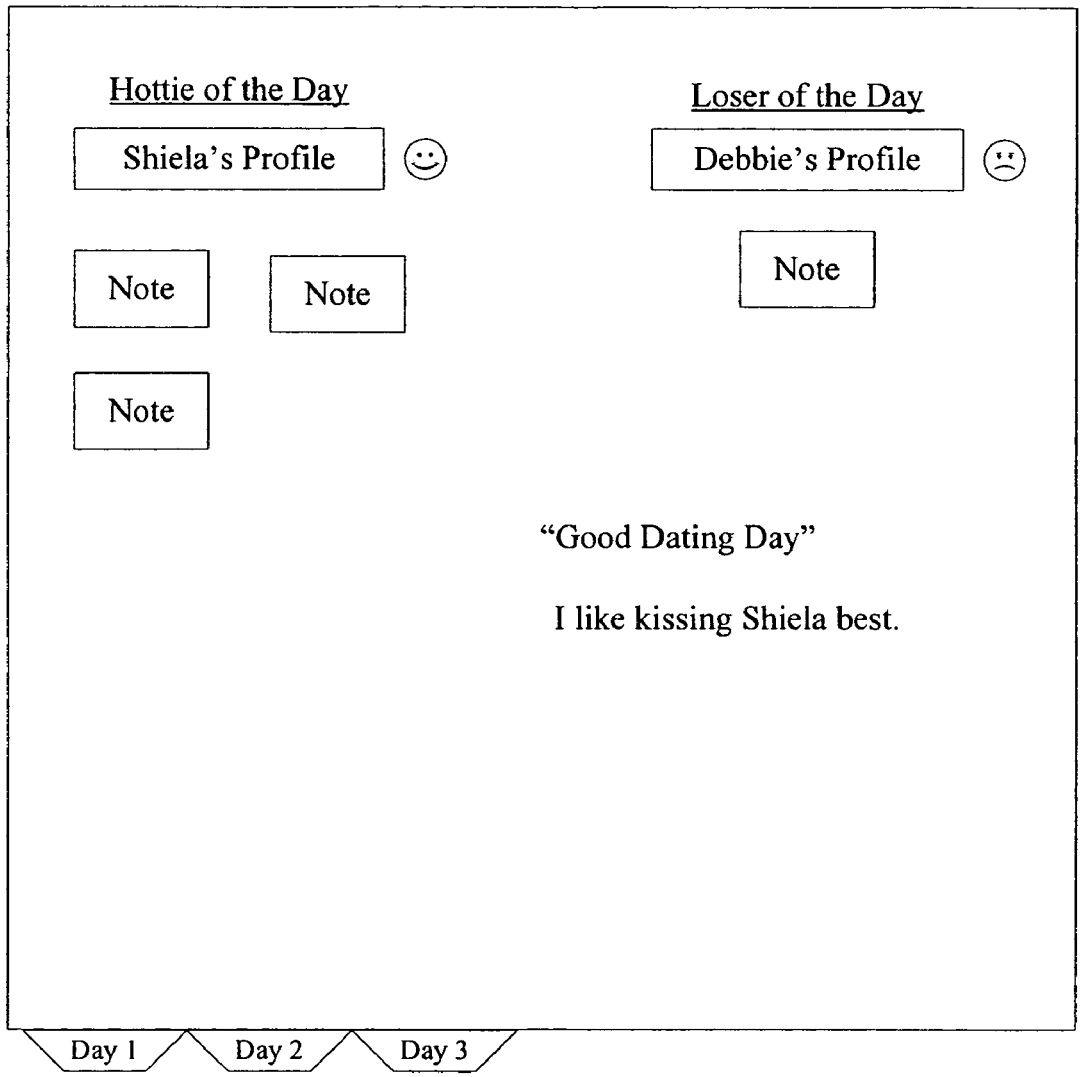
FIG. 8 shows an embodiment of a diary, in accordance with aspects of the present invention.

FIG. 8 shows an embodiment of diary 800. In one embodiment, diary 800 is organized chronologically by day, with tabs that the subscriber may select to view and/or edit the contents of diary 800 for a particular day.

In one embodiment, diary 800 automatically displays any profile(s) with which the subscriber communicated that day. In one embodiment, diary 800 may also include any notes associated with the profile included in the diary, or messages associated with the profile, that the subscriber created on that day and/or in the past. In one embodiment, the subscriber may provide additional content and/or commentary, which may take the form of pictures, text, emoticons, audio files, graphics, movies, colors, animation, and/or the like. In one embodiment, the subscriber may provide commentary for particular profiles, or general commentary for the day and/or the other subscribers that were communicated with.

The above specification, examples, and data provide a complete description of the manufacture and use of the composition of the invention. Since many embodiments of the invention can be made without departing from the spirit and scope of the invention, the invention also resides in the claims hereinafter appended.

What is claimed is:

1. A method for enabling communication in an online dating service, comprising:
   storing a message that is communicated between a user and another user, wherein a profile is associated with said another user;
   associating the message with the profile;
   employing a server device to communicate with a client device to enable the user to provide a note that is associated with at least one of the profile or the message, wherein the note is accessible to the user and by default inaccessible to said another user; and
   employing the server device to enable display of the note to the user along with at least one of the profile or the message
   enabling the user to access a thread list view that includes the profile; and
   enabling the user to access the thread list view for the profile, the thread list view displays a thread associated with the profile, the thread includes the message, and wherein the association of the note with the profile includes associating the note with the message.

2. The method of claim 1, wherein the note includes at least one of a picture, text, emoticon, audio file, graphic, movie, color, or animation.

3. The method of claim 1, wherein the message is at least one of an email message, an Short Message Service (SMS) message, Multimedia Message Service (MMS) message, instant messaging (IM) message, internet relay chat (IRC) message, or blog message.

4. The method of claim 1, wherein the profile includes at least one of income, education, hobbies, politics, marital status, birthday, age, picture, graphic, profession, audio message, thumbnail image, or geographical location associated with said another user.

5. The method of claim 1, wherein enabling display of the note to the user along with the at least one of the profile or the message further comprises:
   if the user requests to view the message, displaying the message to the user such that the message includes a note link, wherein the note link indicates that the note is associated with the message; and
   if the user clicks on the note link, displaying the note.

6. The method of claim 1, further comprising:
   enabling the user to share access of the note with said another user.

7. The method of claim 1, further comprising:
   enabling the user to access a thread list view that includes the profile; and
   enabling the user to access a thread view for the profile, wherein the thread view displays a thread associated with the profile, wherein the thread includes the message, and wherein the association of the note with the profile provides a direct correspondence between the note and the profile.

8. The method of claim 1, wherein enabling display of the note to the user along with the at least one of the profile or the message further includes:

displaying a note link along with the profile, wherein the note link indicates that the note is associated with the profile; and if the user clicks on the note link, displaying the note.

9. The method of claim 8, wherein the note link is displayed as at least one of a graphical image or a thumbnail image.

10. The method of claim 1, further comprising providing a diary to store the note and at least one of the profile or the message.

11. The method of claim 10, further comprising enabling editing of the diary and at least one of its contents.

12. The method of claim 10, wherein the diary includes at least one of a picture, text, emoticon, audio file, graphic, movie, color, video, or animation.

13. A method for managing communications in an online dating service, comprising:

storing a plurality of profiles, wherein a separate user is associated with each profile; enabling display of a thread list view for each user, wherein the thread list view displays a thread list that indicates a profile for each other user with which a message has been exchanged between the user and said another user;

if, in the thread list view, the user selects a profile in the thread list, displaying a thread view which includes a history of messages communicated between the user and another user associated with the selected profile; and employing a server device to communicate with a client device to enable the user to edit a note such that the note is associated with at least one of a profile in the thread list, and a communicated message associated with the profile, and wherein the note is accessible to the user and by default inaccessible to the user associated with the profile; and enabling the user to access a thread list view that includes the profile; and enabling the user to access the thread list view for the profile, the thread list view displays a thread associated with the profile, the thread includes the message, and wherein the association of the note with the profile includes associating the note with the message.

14. The method of claim 13, wherein the thread view displays a history of communication between the user and said another user, a collapsible inline summary of the communication, and a photo thumbnail of said another user.

15. The method of claim 13, further comprising, for each user:

enabling the user to organize the display of the plurality of profiles in the thread list view by hierarchically sorting first those profiles for which the user has associated at least one note.

16. The method of claim 13, further comprising enabling the user to delete at least one profile from the thread list.

17. The method of claim 13, further comprising, for each user:

enabling the user to save profiles in a saved profile list for the user;

enabling display of the saved profile list, along with a note link for each profile for which at least one note has been created by the user, and further along with a view thread link for each profile that is included in the thread list for the user; and if the user clicks on the view thread link, displaying the thread view for the profile.

18. The method of claim 13, wherein, for each user, the thread view further includes at least one draft message saved by the user, wherein a display of a draft message is visually differentiated from a message that has been communicated between the user and said another user.

19. The method of claim 13, further comprising enabling the user to save the note from within the thread view.

20. The method of claim 13, enabling the user to create and edit the note from within the thread list view.

21. The method of claim 13, further comprising providing a diary to store the note and at least one of the profile or the message.

22. A server for communicating in an online dating service, comprising:

a transceiver that is arranged to receive and transmit information on a network; and a processor that is arranged to communicate with the transceiver, wherein the processor is arranged to perform actions, including:

storing a message that is communicated between a user and another user, wherein a profile is associated with said another user;

associating the message with the profile;

enabling the user to provide a note that is associated with at least one of the profile or the message, wherein the note is accessible to the user and by default inaccessible to said another user; and enabling display of the note to the user along with at least one of the profile or the message.

23. The method of claim 1, wherein the note is inaccessible to said another user while the message is accessible to said another user.

24. The method of claim 6, wherein the message is accessible to said another user, and the note is inaccessible to said another user unless the user shares access of the note with said another user.

25. The method of claim 5, further comprising:

if said another user requests to view the message, displaying the message to said another user such that the note is inaccessible to said another user, and such that the message displayed to said another user does not include the note link.

26. The method of claim 5, further comprising:

enabling the user to share access to the note with share another user;

if said another user requests to view the message, and the user has not shared access to the note, displaying the message to said another user such that the note is inaccessible to said another user, and such that the message displayed to said another user does not include the note link;

if said another user requests to view the message, and the user has shared access to the note displaying the message to said another user such that the message includes the note link, wherein the note link indicates that the note is associated with the message; and if said another user clicks on the note link, displaying the note to said another user.

27. The method of claim 1, wherein enabling display of the note to the user along with the at least one of the profile or the message further includes:

if the user requests to view the message, displaying the message to the user such that the message includes the note, such that both the message and the note are displayed whenever the user views the note; and if said another user requests to view the message, displaying the message to said another user such that the note is inaccessible to said another user, and such that the message displayed to said another user does not include the note.

28. The method of claim 1, wherein enabling display of the note to the user along with the at least one of the profile or the message further includes:

if the user requests to view the message, displaying the message to the user such that the message includes the note, such that both the message and the note are displayed whenever the user views the note; and enabling the user to share access to the note with share another user;

if said another user requests to view the message, and the user has not shared access to the note, displaying the message to said another user such that the note is inaccessible to said another user, and such that the message displayed to said another user does not include the note; and if said another user requests to view the message, and the user has shared access to the note, displaying the message to said another user such that the message includes the note, such that both the message and the note are displayed whenever the user views the note if the user has shared access to the note.

29. The method of claim 1, wherein enabling display of the note to the user along with the at least one of the profile or the message further includes:

if the user requests to view the profile, displaying the message to the user such that the profile includes the note, such that both the message and either the note or a note link are displayed whenever the user views the profile; and if said another user requests to view the profile, displaying the profile to said another user such that the note is inaccessible to said another user.

30. The method of claim 1, wherein enabling display of the note to the user along with the at least one of the profile or the message further includes:

if the user requests to view the profile, displaying the profile to the user such that the profile includes the note, such that both the profile and either the note or a note link are displayed whenever the user views the profile;

enabling the user to share access to the note with said another user; and if said another user requests to view the profile, displaying the profile to said another user such that the note is inaccessible to said another user unless the user has shared access to the note with said another user.

* * * * *